(12) United States Patent
Wang et al.

(10) Patent No.: US 12,255,981 B2
(45) Date of Patent: Mar. 18, 2025

(54) METHODS AND APPARATUSES FOR IMPLEMENTING HIGH-SPEED CRYPTOGRAPHIC COMPUTATION BASED ON SOFTWARE-HARDWARE COLLABORATION, AND ELECTRONIC DEVICES

(71) Applicant: Hangzhou Hikvision Digital Technology Co., Ltd., Zhejiang (CN)

(72) Inventors: Bin Wang, Zhejiang (CN); Da Chen, Zhejiang (CN); Xiaohong Guan, Zhejiang (CN); Jiadong Chen, Zhejiang (CN); Wei Wang, Zhejiang (CN); Xing Wang, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/744,248

(22) Filed: Jun. 14, 2024

(65) Prior Publication Data
US 2024/0421972 A1    Dec. 19, 2024

(30) Foreign Application Priority Data
Jun. 15, 2023   (CN) .......................... 202310710460.2

(51) Int. Cl.
*H04L 9/06*    (2006.01)
(52) U.S. Cl.
CPC ....................................... *H04L 9/06* (2013.01)
(58) Field of Classification Search
CPC ......... H04L 9/06; H04L 9/0625; H04L 63/12; H04L 2209/12; H04L 2209/34
See application file for complete search history.

(56) References Cited

U.S. PATENT DOCUMENTS

| | | | | |
|---|---|---|---|---|
| 11,689,353 B2 * | 6/2023 | Boue | ..................... | H04L 9/0637 380/28 |
| 11,728,986 B2 * | 8/2023 | Felker | ..................... | H04L 9/088 380/44 |

(Continued)

FOREIGN PATENT DOCUMENTS

| CN | 111598221 | 8/2020 |
|---|---|---|
| CN | 111859396 | 10/2020 |

(Continued)

OTHER PUBLICATIONS

Lv et al. ("High-performance optimization of SM4-GCM based on FPGA", 2021 International Conference on Advanced Computing and Endogenous Security (Year: 2021).*

(Continued)

*Primary Examiner* — Venkat Perungavoor
*Assistant Examiner* — Peiliang Pan
(74) *Attorney, Agent, or Firm* — Fish & Richardson P.C.

(57) ABSTRACT

The present disclosure provides methods and apparatuses for implementing high-speed cryptographic operations based on software-hardware collaboration, and electronic devices. In the embodiments of the present disclosure, by analyzing software and hardware computing resources in real-time, the cryptographic device driver allocates the one or more target resources for cryptographic computation to the reference data packets. When the one or more target resources include the target cryptographic device, the cryptographic device executes, according to the characteristics of the target cryptographic algorithm used to perform cryptographic computation on the reference data packet, the acceleration operation corresponding to the target cryptographic algorithm for the cryptographic computation on the reference data packets, such as grouping the reference data packets, to improve a concurrent execution rate of an algorithm and cope with (Continued)

situations with a large amount of service concurrency and data processing.

9 Claims, 4 Drawing Sheets

(56) References Cited

U.S. PATENT DOCUMENTS

| | | | |
|---|---|---|---|
| 2002/0199101 A1* | 12/2002 | Krishna | G06F 9/3879 |
| | | | 713/161 |
| 2016/0285743 A1* | 9/2016 | Cheng | H04L 12/1886 |
| 2022/0114150 A1* | 4/2022 | Saurabh | G06F 16/2358 |
| 2022/0366971 A1 | 11/2022 | Tang et al. | |
| 2022/0417015 A1* | 12/2022 | Wang | H04L 9/0841 |
| 2023/0027142 A1* | 1/2023 | Li | H04L 9/0869 |
| 2023/0119255 A1* | 4/2023 | Soubhi | G06F 15/7842 |
| | | | 713/193 |
| 2024/0152655 A1* | 5/2024 | Hamburg | G06F 21/602 |

FOREIGN PATENT DOCUMENTS

| | | |
|---|---|---|
| CN | 112887093 | 6/2021 |
| CN | 113568756 | 10/2021 |
| CN | 114115834 | 3/2022 |
| CN | 115470499 | 12/2022 |
| CN | 116232593 | 6/2023 |
| CN | 116248414 | 6/2023 |

OTHER PUBLICATIONS

Notice of Allowance in Chinese Appln. No. 202310710460.2, mailed on Jul. 27, 2023, 7 pages (with English translation).

Zhang, "Research and Implementation of SM4 Cryptographic Algorithm Accelerator Based on Software and hardware co-design," A thesis for the degree of Master in Engineering, Xidian University, May 5, 2023, 98 pages.

* cited by examiner

METHODS AND APPARATUSES FOR IMPLEMENTING HIGH-SPEED CRYPTOGRAPHIC COMPUTATION BASED ON SOFTWARE-HARDWARE COLLABORATION, AND ELECTRONIC DEVICES

CROSS REFERENCE TO RELATED APPLICATIONS

This application claims priority to Chinese Patent Application No. CN 2023107104602, and filed on Jun. 15, 2023, the entire content of which is incorporated herein by reference.

TECHNICAL FIELD

The present disclosure relates to the technical field of data security, and in particular to methods and apparatuses for implementing high-speed cryptographic computation based on software-hardware collaboration, and electronic devices.

BACKGROUND

Cryptographic devices, such as cryptographic cards, crypto s, and other hardware, as infrastructures for ensuring data security in large-scale systems, are becoming increasingly diverse. For example, a plurality of cryptographic modules can be integrated into a cryptographic device. The cryptographic module is a relatively independent hardware cryptographic module that has cryptographic computation functions, also known as cryptographic computation unit.

In application scenarios such as big data, there are often situations with a large amount of service concurrency and data processing. As a hardware device, the cryptographic device, limited by its own business concurrency capacity and data processing capacity, often encounters difficulties in coping with the aforementioned situations.

SUMMARY

The embodiments of the present disclosure provides a method for implementing high-speed cryptographic computation based on software-hardware collaboration, where the method is applied to a server equipped with at least one cryptographic device, and includes: by a host machine software development kit (SDK) that is compatible with the at least one cryptographic device, performing a compliance check on a current to-be-processed data packet, and performing pre-processing on one or more current to-be-processed data packets that pass the compliance check to obtain one or more reference data packets. Where the pre-processing includes at least one of: according to a request type and a packet size of the one or more current to-be-processed data packets that pass the compliance check, splitting or recombining the one or more current to-be-processed data packets to enable a size of each of the reference data packets to meet an optimal packet size requirement corresponding to the request type; or performing encoding format conversion on a data packet that is to be transmitted to a cryptographic device driver that is compatible with the at least one cryptographic.

The method further includes: by the cryptographic device driver, according to current weight factors for available resources corresponding to at least one to-be-executed cryptographic algorithm required by the reference data packets, determining one or more target resources from the available resources with a load balancing principle, where the available resources include the at least one cryptographic device; and when the one or more target resources include a target cryptographic device in the at least one cryptographic device, performing, by the target cryptographic device, an acceleration operation corresponding to a target cryptographic algorithm, to perform cryptographic computation on the reference data packets. Where the available resources are software and hardware resources in the server capable of performing cryptographic computation on the reference data packets, and the target cryptographic algorithm is one of at least one to-be-executed cryptographic algorithm provided by the target cryptographic device. Furthermore, when the target cryptographic algorithm is an SM4 algorithm in a CTR mode, the acceleration operation at least includes: by the target cryptographic device, grouping the reference data packets to obtain at least one group of reference data packets; according to an ECB mode different from the CTR mode, concurrently scheduling each group of reference data packets; and performing a specified mathematical operation on a processing result of the concurrent scheduling and an iteration result to obtain a concurrent acceleration result of the CTR mode, where the iteration result is obtained by a deployed CTR software counter iterating according to a specified iteration specification.

For the above method, optionally, the available resources include: all software resources and all hardware resources in the server that are configured for cryptographic computation; or software and/or hardware resources in the server whose confidence matches a priority of the reference data packet. Where the priority of the reference data packet is determined according to an evaluation score of the reference data packet from a classification evaluation perspective; and the classification evaluation perspective at least includes: a sensitivity level of sensitive data involved in the reference data packet, an importance level of a service involved in the reference data packet, or an identity type of a request subject for the reference data packet.

For the above method, optionally, for each of the at least one to-be-executed cryptographic algorithm, the current weight factors for the available resources corresponding to the to-be-executed cryptographic algorithm is obtained by fusing weight factors of multiple evaluation dimensions. Where the multiple evaluation dimensions include a confidence of an available resource and a load idleness of the available resources.

For the above method, optionally, for each of candidate resources in the available resources, fusing operation according to the weight factors of the multiple evaluation dimensions includes: obtaining a weight factor of each evaluation dimension for the candidate resource corresponding to the to-be-executed cryptographic algorithm; calculating a weighted sum according to a weight of each of the multiple evaluation dimensions, and the weight factor of each of the evaluation dimensions for the candidate resource corresponding to the to-be-executed cryptographic algorithm, and determining the weighted sum as the current weight factor corresponding to the to-be-executed cryptographic algorithm for the candidate resource.

For the above method, optionally, according to current weight factors for available resources corresponding to at least one to-be-executed cryptographic algorithm required by the reference data packets, determining one or more target resources from the available resources with a load balancing principle includes: for each of the at least one to-be-executed cryptographic algorithm, determine the to-be-executed cryptographic algorithm as a target cryptographic algorithm; for the candidate resources in the available resources, according to the current weight factor for each of the candidate resources corresponding to the target cryptographic algorithm, by a load balancing algorithm according to weighted round robin, determining the one or more target resources for the target cryptographic algorithm from the candidate resources.

For the above method, optionally, when the target cryptographic algorithm is an SM2 algorithm, the acceleration operation at least includes: identifying whether a target key exists in internal keys cached by the target cryptographic device, in response to identifying that the internal keys include the target key exists, performing cryptographic computation with the target key, and resetting a time-to-live of the target key. Where each of internal keys is decrypted in batches and cached into the target cryptographic device when a user bounded with the internal key passes identity authentication at first time, the internal keys at least include: a second level key, or a second level key and a third level key; and if the time-to-live of any one of the internal keys expires, the internal key is deleted.

Optionally, the above method further includes: by an algorithm modeling and analysis engine built on the cryptographic device driver, analyzing a data profile within a set time period, where the data profile is configured to analyze whether there is a risk, such that when there is a risk, a corresponding repair strategy is used to repair the risk. Among them, the data profile at least represents at least one of: data traffic, including data traffic of a data channel between the cryptographic device driver and the available resources for cryptographic computation within the set time period, and data traffic flowing through the available resources within the set time period; frequency of usage, of each of the available resources during the set time period; a load condition, indicating a computational load of each of the available resources within the set time period; a stable computation parameter, indicating a failure rate of each of the available resources within the set time period; or frequency of unauthorized access, indicating a number of unauthorized access during the set time period.

The embodiments of the present disclosure further provide a method for implementing high-speed cryptographic computation based on software-hardware collaboration, where the method is applied to any cryptographic device equipped on a server, and the server is further equipped with a cryptographic device driver compatible with the cryptographic device. The method includes: when the cryptographic device is identified by the cryptographic device driver as a target cryptographic device for cryptographic computation on reference data packets, performing cryptographic computation on the reference data packets by executing an acceleration operation corresponding to a target cryptographic algorithm. Where the target cryptographic algorithm is one of the at least one cryptographic algorithm required by the reference data packets provided by the cryptographic device, where when the target cryptographic algorithm is an SM4 algorithm in a CTR mode, the acceleration operation at least includes: grouping the reference data packets to obtain at least one group of reference data packets; according to an ECB mode different from the CTR mode, concurrently scheduling each group of reference data packets; and transmitting a processing result of the concurrent scheduling to a specified component of the server, where the specified component includes a CPU or a GPU, such that the specified component performs a specified mathematical operation on the processing result of the concurrent scheduling and an iteration result to obtain a concurrent acceleration result of the CTR mode; or the cryptographic device itself performs a specified mathematical operation on a processing result of the concurrent scheduling and an iteration result. Where the iteration result is obtained by a deployed CTR software counter iterating according to a specified iteration specification.

For the above method, optionally, when the target cryptographic algorithm is an SM2 algorithm, the acceleration operation at least includes: identifying whether a target key exists in internal keys cached by the target cryptographic device, in response to identifying that the internal keys include the target key exists, performing cryptographic computation with the target key, and resetting a time-to-live of the target key. Where each of internal keys is decrypted in batches and cached into the target cryptographic device when a user bounded with the internal key passes identity authentication at first time, the internal keys include: a second level key, or a second level key and a third level key; and if the time-to-live of any one of the internal keys expires, the internal key is deleted The embodiments of the present disclosure further provide an apparatus for implementing high-speed cryptographic computation based on software-hardware collaboration, where the apparatus is applied to a server, and the server is equipped with at least one cryptographic device, and a host machine software development kit (SDK) and a cryptographic device driver that are compatible with the at least one cryptographic device. The apparatus includes a host machine SDK calling unit, configured to perform a compliance check on a current to-be-processed data packet, and perform pre-processing on one or more current to-be-processed data packets that pass the compliance check to obtain one or more reference data packets. Where the pre-processing includes at least one of: according to a request type and a packet size of the one or more current to-be-processed data packets that pass the compliance check, splitting or recombining the one or more current to-be-processed data packets to enable a size of each of the reference data packets to meet an optimal packet size requirement corresponding to the request type; or performing encoding format conversion on a data packet that is to be transmitted to a cryptographic device driver that is compatible with the at least one cryptographic.

The apparatus further includes a driver calling unit, configured to, by the cryptographic device driver, according to current weight factors for available resources corresponding to at least one to-be-executed cryptographic algorithm required by the reference data packets, determine one or more target resources from the available resources with a load balancing principle, where the available resources include the at least one cryptographic device. Where the available resources are software and hardware resources in the server capable of performing cryptographic computation on the reference data packets.

The apparatus further includes a cryptographic device calling unit, configured to, when the one or more target resources include a target cryptographic device in the at least one cryptographic device, perform, by the target cryptographic device, an acceleration operation corresponding to a target cryptographic algorithm, to perform cryptographic computation on the reference data packets. Where the target cryptographic algorithm is one of the at least one to-be-executed cryptographic algorithm provided by the target cryptographic device; and when the target cryptographic algorithm is an SM4 algorithm in a CTR mode, the acceleration operation at least includes: by the target cryptographic device, grouping the reference data packets to obtain at least one group of reference data packets; according to an ECB mode different from the CTR mode, concurrently scheduling each group of reference data packets; and performing a specified mathematical operation on a processing result of the concurrent scheduling and an iteration result to obtain a concurrent acceleration result of the CTR mode. Where the iteration result is obtained by a deployed CTR software counter iterating according to a specified iteration specification.

The embodiments of the present disclosure further provide an apparatus for implementing high-speed cryptographic computation based on software-hardware collaboration, where the apparatus is applied to any cryptographic device equipped on the server. The apparatus includes: a receiving unit, configured to, when the cryptographic device is determined to perform cryptographic computation on reference data packets, receive reference data packets to be subjected to the cryptographic computation; and an acceleration unit, configured to perform an acceleration operation corresponding to a target cryptographic algorithm, to perform the cryptographic computation on the reference data packets. Where the target cryptographic algorithm is one of the at least one cryptographic algorithms required by the reference data packets and is provided by the cryptographic device; and when the target cryptographic algorithm is an SM4 algorithm in a CTR mode, the acceleration operation at least includes: grouping the reference data packets to obtain at least one group of reference data packets; according to an ECB mode different from the CTR mode, concurrently scheduling each group of reference data packets; and transmitting a processing result of the concurrent scheduling to a specified component of the server, where the specified component includes a CPU or a GPU, such that the specified component performs a specified mathematical operation on the processing result of the concurrent scheduling and an iteration result to obtain a concurrent acceleration result of the CTR mode; or the cryptographic device itself performs a specified mathematical operation on a processing result of the concurrent scheduling and an iteration result, to obtain a concurrent acceleration result of the CTR mode. Where the iteration result is obtained by a deployed CTR software counter iterating according to a specified iteration specification.

The embodiments of the present disclosure further provide an electronic device, including one or more processors and one or more machine-readable storage media; where the one or more machine-readable storage media store computer instructions, and when the computer instructions are executed by the one or more processors, the method according to any method mentioned above is implemented.

From the above, it can be seen that in the embodiments of the present disclosure, by analyzing software and hardware computing resources in real-time, the cryptographic device driver allocates the one or more target resources for cryptographic computation to the reference data packets. When the one or more target resources include the target cryptographic device, the cryptographic device executes, according to the characteristics of the target cryptographic algorithm used to perform cryptographic computation on the reference data packet, the acceleration operation corresponding to the target cryptographic algorithm for the cryptographic computation on the reference data packets, such as grouping the reference data packets, to improve a concurrent execution rate of an algorithm and cope with situations with a large amount of service concurrency and data processing.

Furthermore, in the embodiments of the present disclosure, the host machine SDK compatible with the cryptographic device is configured to perform the compliance check on the current to-be-processed data packet, and the one or more current to-be-processed data packets that pass the compliance check is pre-processed (such as dynamically arranging the one or more current to-be-processed data packet) to reduce the impact of packet size variation on data processing performance and latency.

BRIEF DESCRIPTION OF DRAWINGS

Accompanying drawings herein are incorporated into and constitute a part of the specification, illustrate embodiments consistent with the present disclosure, and are combined with the description to explain the principle of the present disclosure.

DETAILED DESCRIPTION

Figure 1:
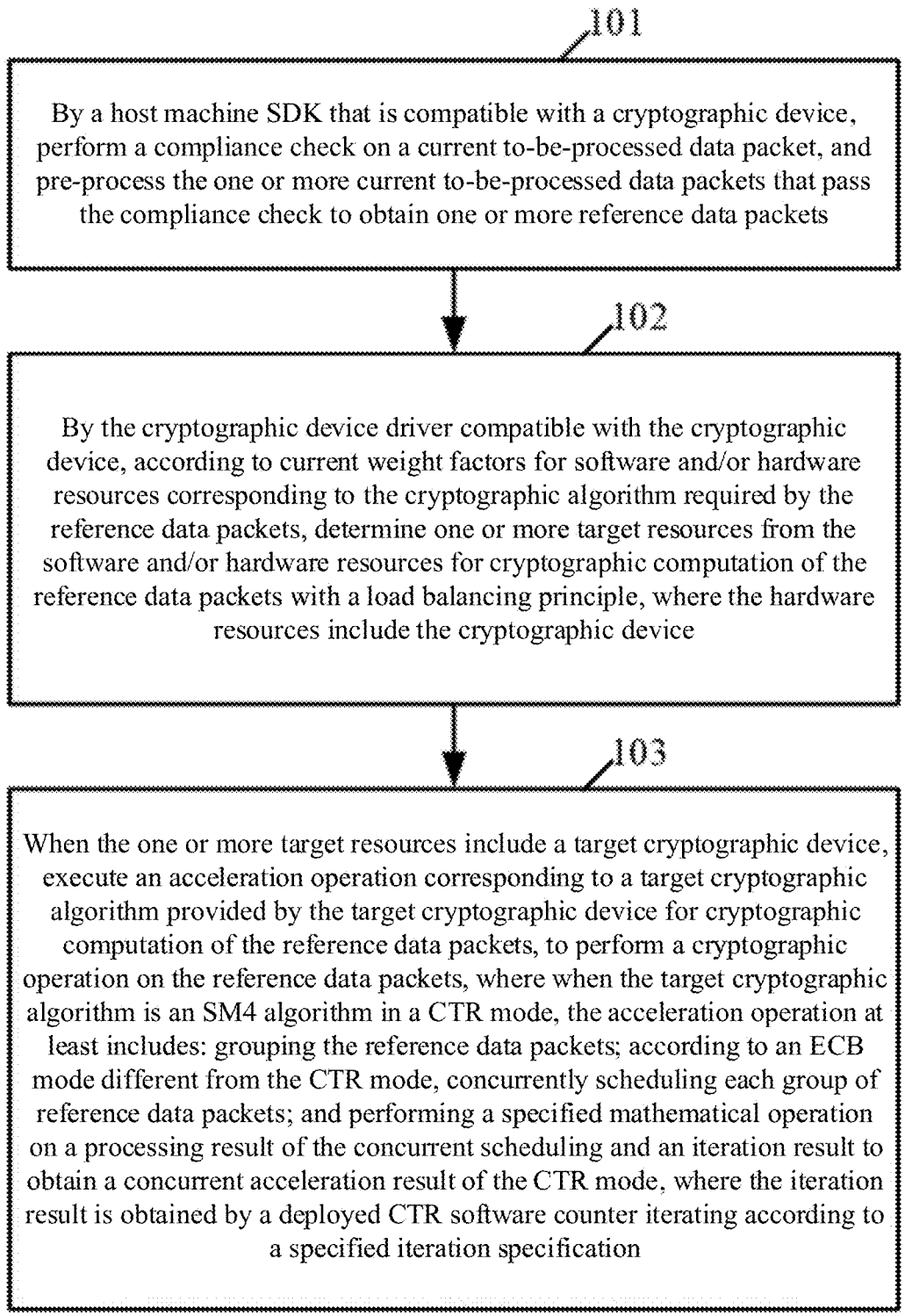
FIG. 1 is a flowchart of a method provided in embodiments of the present disclosure.

Embodiments will be described in detail here with the examples thereof expressed in the drawings. When the following descriptions involve the drawings, like numerals in different drawings represent like or similar elements unless stated otherwise. Embodiments described in the illustrative examples below are not intended to represent all embodiments consistent with the present disclosure. Rather, they are merely embodiments of devices and methods consistent with some aspects of the present disclosure as recited in the appended claims.

Terms used in the present disclosure is only for the purpose of describing particular embodiments and is not intended to limit the present disclosure. As used in the present disclosure and the appended claims, the singular forms "a", "said" and "the" are intended to include the plural" and "the" are intended to include the plural forms as well, unless the context clearly dictates otherwise.

In order to enable those skilled in the art to better understand the technical solutions provided in the embodiments of the present disclosure, and to make the above objectives, features, and advantages of the embodiments of the present disclosure more understandable, the technical solutions in the embodiments of the present application are further described in detail below in conjunction with the accompanying drawings.

Figure 2:
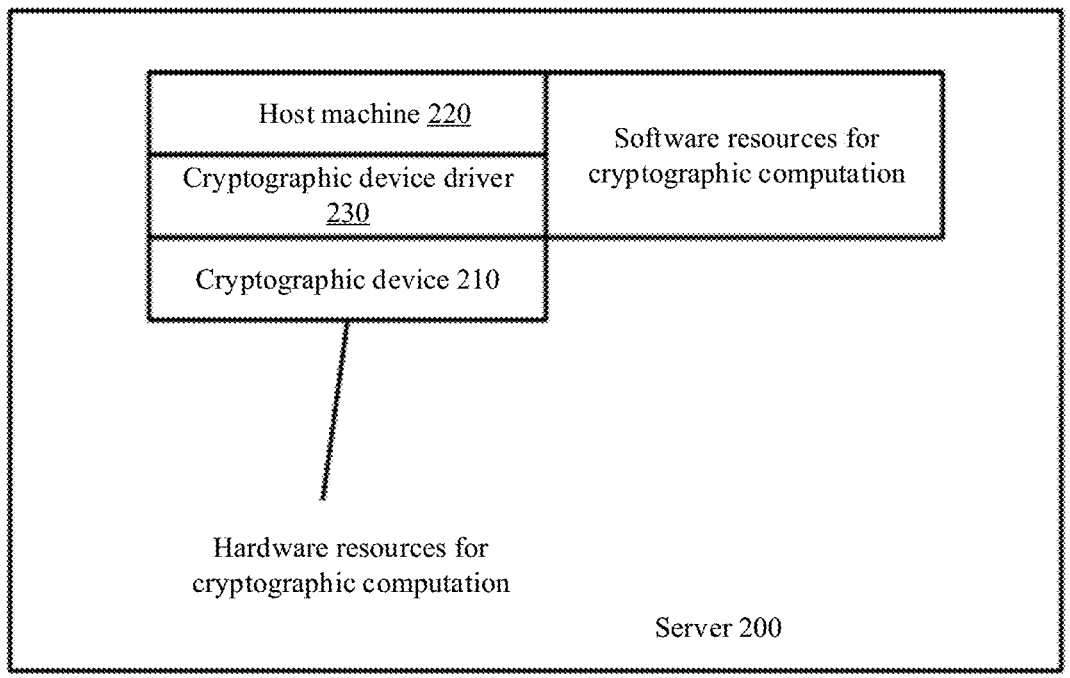
FIG. 2 is a schematic structural diagram of a server provided in embodiments of the present disclosure.

Referring to FIG. 1, FIG. 1 is a flowchart of a method for implementing high-speed cryptographic computation based on software-hardware collaboration provided in embodiments of the present disclosure. The method is applied to a server 200. FIG. 2 illustrates a structure of the server 200 as an example. In this embodiment, the server 200 is equipped with at least one cryptographic device 210. The cryptographic device 210, such as a cryptographic card, or a crypto, etc., is equivalent to hardware and may at least include a Field Programmable Gate Array (FPGA), a System On Chip (SOC), or other hardware. In this embodiment, the server 200 is further equipped with a host machine software development kit (SDK) 220 and a cryptographic device driver 230 that are compatible with the cryptographic device 210. The cryptographic device 210 is used in conjunction with the host machine SDK 220 and the cryptographic device driver 230. In some embodiments, each cryptographic device equipped on the server 200 can share the same cryptographic device driver and the same host machine SDK, which is not limited in the present disclosure.

As shown in FIG. 1, the method may include following steps 101 to 103.

In step 101, by a host machine SDK that is compatible with a cryptographic device, a compliance check is performed on a current to-be-processed data packet, and the one or more current to-be-processed data packets that pass the compliance check is pre-processed to obtain one or more reference data packets.

In a specific application, the host machine SDK compatible with the cryptographic device serves as a calling entry of the cryptographic device. In a conventional application, the host machine SDK of the cryptographic device only performs simple data transmission, specifically transmitting the current to-be-processed data packets to the cryptographic device driver. In this embodiment, improvements are made to the host machine SDK that is compatible with the cryptographic device. Specifically, before the host machine SDK transmits the current to-be-processed data packet to the cryptographic device driver, the current to-be-processed data packet is first subjected to the compliance check, and the one or more current to-be-processed data packets that pass the compliance check is pre-processed to obtain one or more reference data packets. Afterwards, the reference data packets are transmitted to the cryptographic device driver.

As an embodiment, there are many ways to perform the compliance check on the current to-be-processed data packet, such as an identity check for a request subject (a request end, i.e., a source end, of the current to-be-processed data packet), and/or a request type check, and/or a data packet compliance check, etc., which is not limited in the present disclosure.

In some embodiments, the identity check for the request subject is to check whether the request end (i.e., the source end) of the current to-be-processed data packet has a permission for an operation corresponding to an operation identifier in the current to-be-processed data packet, or whether the request end has a permission for a newly imported key when the current to-be-processed data packet carries the newly imported key, etc.

In some embodiments, the request type check is to check which cryptographic device function, or algorithm to use, and whether the cryptographic device supports the cryptographic device function, or the algorithm, which is not limited in the present disclosure.

In some embodiments, the data packet compliance check is to check whether an encoding format and size of the current to-be-processed data packet comply with a regulation, which is not limited in the present disclosure.

In the embodiments, the compliance check is performed on the current to-be-processed data packet, which can perform data purification, remove redundant data (such as data packets that have not passed any of the above checks), avoid redundant data being transmitted to the cryptographic device driver for subsequent cryptographic computation processing and occupy valuable high-speed computing resources, and improve a utilization rate of computing resources of the cryptographic device.

In this embodiment, after the one or more current to-be-processed data packets pass the compliance check, as described in step 101, the one or more current to-be-processed data packets that pass the compliance check can be pre-processed, such that the one or more current to-be-processed data packets are processed into one or more data packets that meet the requirements of the cryptographic device driver. Here, the requirements of the cryptographic device driver are based on the purpose of improving the utilization rate of computing resources of the cryptographic device, which is not limited in the present disclosure.

As an embodiment, the pre-processing of the one or more current to-be-processed data packets that pass the compliance check may include at least one of: according to a request type and a packet size of the current to-be-processed data packet, splitting or recombining the one or more current to-be-processed data packets to enable a size of each of the reference data packets to meet an optimal packet size requirement corresponding to the request type; or performing encoding format conversion on a data packet (such as the data packets obtained after splitting or recombining as mentioned above, or the current to-be-processed data packet without splitting or recombining) that is to be transmitted to a cryptographic device driver, to reduce encoding redundancy.

Optionally, in this embodiment, a corresponding optimal packet size requirement can be set in advance for each request type. According to the setting, in this embodiment, as described above, the one or more current to-be-processed data packets can be split or recombined according to the request type and the packet size of the current to-be-processed data packet, to enable the size of each reference data packet to meet the optimal packet size requirement corresponding to the request type, which can avoid low-density data packets (smaller than a set minimum threshold) being directly transmitted to the cryptographic device driver for a subsequent cryptographic computation and occupying valuable high-speed computing resources.

Optionally, in this embodiment, performing the encoding format conversion on the data packet to be transmitted to the cryptographic device driver can include: according to a set compression algorithm, compressing and converting the encoding format of the data packet into a simple encoding format required by the compression algorithm.

The above provides an example description of pre-processing the one or more current to-be-processed data packet. As described in step 101, after pre-processing the current to-be-processed data packet, a pre-processed data packet can be obtained, which can be referred to as a reference data packet. The number of reference data packets is greater than or equal to 1. After obtaining the reference data packet, as an embodiment, the cryptographic device driver can be called, such that the reference data packet can be transmitted to the cryptographic device driver. Afterwards, step 102 is processed.

In step 102, by the cryptographic device driver, according to current weight factors for available resources corresponding to at least one to-be-executed cryptographic algorithm required by the reference data packets, one or more target resources are determined from the available resources with a load balancing principle. Where the available resources include the cryptographic device equipped on the server. The to-be-executed cryptographic algorithm is required by the reference data packet, that is, the to-be-executed cryptographic algorithm is required for performing cryptographic computation on the reference data packet. The one or more target resources include one of the available resources to be used for executing at least one to-be-executed cryptographic algorithm.

The cryptographic device driver is the "bridge" for traffic transmission between the host machine SDK of the cryptographic device and the cryptographic device. In a conventional application, a cryptographic device driver only performs simple data unpacking on data packets to be processed by the cryptographic device for cryptographic computation and insert them into a corresponding data queue of the cryptographic device, for data transparent transmission to the cryptographic device, where the data queue can be a hardware channel of the cryptographic device, such as a Peripheral Component Interconnect Express (PCIE), a Universal Serial Bus (USB), or other data queues. In the embodiments of the present disclosure, the cryptographic device driver is improved.

For example, the following step is added to the cryptographic device driver: dynamically identifying and summarizing currently available software and hardware resources in the server.

Optionally, the software resource may include a Central Processing Unit (CPU), a Graphics Processing Unit (GPU), a Data Processing Unit (DPU), a Video Processing Unit (VPU), a network card, or other software resources with cryptographic computing capabilities in the server. The hardware resource may include a collection of cryptographic devices, such as at least one cryptographic card, or at least one crypto, etc.

As an embodiment, currently available resources in the server are all software resources and all hardware resources in the server that are available for the cryptographic computation.

As another embodiment, the currently available resources in the server are software and hardware resources in the server whose confidence matches a priority of the reference data packet. In this embodiment, the priority of the reference data packet is determined according to an evaluation score of the reference data packet from a set classification evaluation perspective. For example, according to the evaluation score of the reference data packet from the set classification evaluation perspective, an operation such as averaging can be performed to determine the priority of the reference data packet.

In some embodiments, the classification evaluation perspective can be set according to needs. For example, the classification evaluation perspective at least includes: a sensitivity level of sensitive data involved in the reference data packet, an importance level of a service involved in the reference data packet, or an identity type of a request subject for the reference data packet, etc., which is not limited in the present disclosure.

The determination of the one or more target resources in step 102 mainly depends on confidence and load idleness. Confidence and load idleness are two relatively top-level evaluation dimensions. Under static conditions, devices such as cross domain nodes, boundary devices, and core area devices have high security requirements, and the priority of setting confidence is higher than the priority of setting load idleness. Under dynamic conditions, according to an actual operating security environment of the device, if it is detected that the device may be at risk of attack, the weight of the confidence of the device may be dynamically increased. In this embodiment, the aforementioned software resources and/or hardware resources may be configured with corresponding confidence and load idleness. Where the confidence can be represented by a weight factor. For example, the confidence weight factor of a hardware resource is greater than the confidence weight factor of a software resource, and the confidence weight factor of a local cryptographic device is greater than the confidence weight factor of a remote cryptographic device. In some embodiments, a reference data packet with high priority will be allocated to idle software and hardware resources with high confidence for cryptographic computation. Where idleness is also represented by weight factors. For example, the idleness weight factor of an computing resource with a high computing capability is greater than the idleness weight factor of an computing resource with a low computing capability. For example, all the above software and hardware resources can be sorted according to idleness weight factors, to select one or more idle software and hardware resources.

Both confidence and load idleness have default weighting factors (also can be referred to as static weighting factors). The configuration of weight factors can be modified offline by administrators or dynamically changed according to real-time service situations. For example, if a new computing resource is added, the weighting factors will be rearranged. Alternatively, if the device detects that an original computing resource is untrusted or overloaded, the weight factor of the original computing resource will be dynamically reduced. The dynamic change of a weight factor mainly depends on whether the confidence and/or the load idleness of an computing resource has changed and/or rearranged.

The confidence weight factor and load idleness weight factor of each computing resource can be fused to obtain a fused weight factor of the computing resource. For example, a weighted sum can be calculated for the confidence weight factor and the load idleness weight factor of each computing resource. For example, for four computing resources, the current confidence weighting factors are respectively 0.3, 0.3, 0.3, and 0.1, and the load idleness weighting factors are respectively 0.1, 0.2, 0.1, and 0.6, and weights for the two dimensions of confidence and load idleness are respectively 0.1 and 0.9, such that the fused weighting factors for the four computing resources obtained through weighted sum are respectively 0.12 (=0.3*0.1+0.1*0.9), 0.21 (=0.3*0.1+0.2*0.9), 0.12 (=0.3*0.1+0.1*0.9), and 0.55 (=0.1*0.1+0.6*0.9). After the fused weighting factors for all computing resources (such as the above 0.12:0.21:0.12:0.55) are determined, computing power can be allocated according to the fused weighting factors with the load balancing principle, and thereby the one or more target resources for executing the to-be-executed cryptographic algorithm is determined. It should be noted that the computing power allocation according to the weight factors of computing resources and the load balancing principle can be carried out by any algorithm well-known to those skilled in the art, such as the load balancing algorithm according to weighted round robin, which is not elaborated in the present disclosure.

In step 103, when the one or more target resources include one (hereinafter also can be referred to as a target cryptographic device) of the at least one cryptographic device, by target cryptographic device, an acceleration operation corresponding to a target cryptographic algorithm is performed, to perform a cryptographic operation on the reference data packets. Where the target cryptographic algorithm is one of the at least one to-be-executed cryptographic algorithm provided by the target cryptographic device. When the target cryptographic algorithm is an SM4 algorithm in a Counter (CTR) mode, the acceleration operation at least includes: grouping the reference data packets; according to an Electronic Codebook (ECB) mode different from the CTR mode, concurrently scheduling each group of reference data packets; and performing a specified mathematical operation on a processing result of the concurrent scheduling and an iteration result to obtain a concurrent acceleration result of the CTR mode, where the iteration result is obtained by a deployed CTR software counter iterating according to a specified iteration specification.

For any cryptographic device, in a conventional application, an FPGA or an SOC is usually called for conventional cryptographic computation. In this embodiment, before calling the FPGA or the SOC for conventional cryptographic computation, the cryptographic device first performs, according to the characteristic of the cryptographic algorithm (such as SM2, SM4, or SM9, etc.), key step splitting, intermediate operation result and key caching, to achieve acceleration of the cryptographic algorithm.

As an embodiment, for example, when the above cryptographic algorithm is the SM4 algorithm in the CTR mode, since the ECB mode of the SM4 algorithm can be executed concurrently, which is usually faster than the CTR mode of pipeline execution. This embodiment combines the idea of software-hardware collaboration, and by analyzing the characteristic of the CTR mode, and it is divided into the following steps: an SM4 basic grouping operation step, a CTR software counter iteration (equivalent to software implementation) step, and a specified mathematical operation step.

Optionally, the SM4 basic grouping operation step mentioned above is allocated by default to the hardware resource, i.e., concurrently executed by an FPGA layer of the cryptographic device. Specifically, the reference data packets are grouped, and each group of reference data packets is concurrently scheduled in an ECB mode different from the CTR mode to obtain the concurrent processing result. Here, the number of SM4 algorithm cores that can be executed concurrently at the FPGA layer can be set according to real-time request status. For example, Apr. 16, 1964 algorithm loads are set for scheduling execution. In addition, in this embodiment, grouping of reference data packets can be carried out according to a set grouping requirement, which is not limited in the present disclosure.

Optionally, the above CTR software counter iteration step can be allocated by default to a software resource, such as CPU/GPU of the server. Specifically, the deployed CTR software counter (essentially a software) iterates according to a specified iteration specification to obtain the iteration result.

Optionally, the above specified mathematical operation step can be allocated by default to a software resource, such as CPU/GPU of the server, and specifically involves performing a specified mathematical operation such as XOR on the concurrent processing result and the iterative result, to ultimately obtain the concurrent acceleration result in the CTR mode. Compared to a conventional pipeline CTR mode, in this embodiment, the CTR mode is split and concurrently executed, which achieves concurrent acceleration of the CTR algorithm mode.

As another embodiment, for example, the target cryptographic algorithm is the SM2 algorithm. The SM2 algorithm performs cryptographic computation by key index. In a conventional application, it is necessary to search for a key according to a key index, and then decrypt, according to the key, another key that have been encrypted by the key (for example, if the key found by the key index is a second level root key, the another key is a third level key), and then use the another key for cryptographic computation. In this embodiment, the SM2 algorithm can be accelerated. For example, it is identified whether a required target key exists in internal keys cached by the target cryptographic device, and if so, the target key is used for cryptographic computation, which greatly saves the computation time of the cryptographic device compared to real-time decryption of keys.

As an embodiment, for each of the internal keys, such as a second level key, or a second level key and a third level key, the internal key is decrypted in batches and cached in the target cryptographic device when the user bounded with the internal key passes identity authentication at first time. Here, the user bounded with the internal key passing the identity authentication at first time refers to passing the first identity authentication initiated by the user after registration, or passing the identity authentication initiated by the user logging in again after logging out.

In this embodiment, any key in the cache is configured with a corresponding time-to-live. If a key is used for cryptographic computation, the time-to-live of the key is reset. If the time-to-live of any one of the internal keys in the cache expires, the internal key is deleted. Optionally, the keys that have expired and been deleted from the cache mentioned above need to be authenticated by the user again before being decrypted and cached in batches.

The above description takes the target cryptographic device as an example to describe the target resource. If the one or more target resources include a software resource such as a CPU, the AVX (Advanced Vector Extensions) instruction set method can be used to execute the acceleration operation corresponding to the target cryptographic algorithm mentioned above. For another example, if the one or more target resources include a software resource such as a GPU, the CUDA (Compute Unified Device Architecture) instruction set method can be used to perform the acceleration operation (parallel acceleration) corresponding to the target cryptographic algorithm. The embodiments of the present disclosure do not specifically limit the cryptographic computation of software resources.

From the method shown in FIG. 1, it can be seen that in the embodiments of the present disclosure, by analyzing software and hardware computing resources in real-time, the cryptographic device driver allocates the one or more target resources for cryptographic computation to the reference data packets. When the one or more target resources include the target cryptographic device, the target cryptographic device executes, according to the characteristics of the target cryptographic algorithm used to perform cryptographic computation on the reference data packet, the acceleration operation corresponding to the target cryptographic algorithm for the cryptographic computation on the reference data packets, such as grouping the reference data packets, to improve a concurrent execution rate of an algorithm and cope with situations with a large amount of service concurrency and data processing.

Furthermore, in the embodiments of the present disclosure, the host machine SDK compatible with the cryptographic device is configured to perform the compliance check on the current to-be-processed data packet, and the one or more current to-be-processed data packets that pass the compliance check is pre-processed (such as dynamically arranging the current to-be-processed data packet) to reduce the impact of packet size variation on data processing performance and latency.

It should be noted that in this embodiment, in order to avoid wasting computing resources, before performing the acceleration operation corresponding to the target cryptographic algorithm on the reference data packet by the target cryptographic device, the data type of the reference data packet can first be determined, where the data type can be determined according to the sensitivity of the sensitive data involved in the reference data packet, the importance of the service involved in the reference data packet, and the identity type of the request subject of the reference data packet, and then it is checked whether a permission corresponding to the data type is allowed to perform an operation (such as turning off a light) required by the reference data packet, and if so, the acceleration operation corresponding to the target cryptographic algorithm is continued; if not, the cryptographic computation of the current reference packet ends.

In addition, in this embodiment, an algorithm modeling and analysis engine built on the cryptographic device driver can further be used to analyze a data profile within a set time period. Where the data profiling can be output to the user and is mainly used to analyze whether there is a risk. For example, when a data profile indicates a risk, the user can promptly adopt a corresponding repair strategy to repair (or fix) the risk.

For example, the data profile represents at least one of: data traffic, including data traffic of a data channel between the cryptographic device driver and the resources for executing cryptographic computation within the set time period, and data traffic flowing through the resources within the set time period; frequency of usage, of each of the resources during the set time period; a load condition, indicating a computational load of each of the resources within the set time period; a stable computation parameter, indicating a failure rate of each of the resources within the set time period; or frequency of unauthorized access, indicating a number of unauthorized access during the set time period.

Where if the software and/or hardware resources receive a data packet from unauthorized sources within the set time period, or if the software and/or hardware resources find that the sensitive data level of the data packet does not match the resource, the number of unauthorized accesses is considered to increase by a set value.

In this embodiment, by outputting the above data profile, such as displaying the data profile on an LCD/LED screen, it is convenient for the users to analyze the a potential risk they may face, and when the risk are identified, the corresponding repair strategy is promptly adopted to repair the risk, e.g., the execution strategy of current and subsequent requests is immediately adjusted (such as changing an execution link of a certain algorithm, removing untrusted software and/or hardware computing resources, etc.), to ensure efficient service execution and data security.

Furthermore, in this embodiment, improvements can be made to the cryptographic device to enable the cryptographic device to further have a network card data processing function (such as receiving packet, transmitting packet, and processing data by the FPGA of the cryptographic device), data encoding and decoding processing functions (such as implementing H264, or H265 video encoding and decoding algorithm by the FPGA of the cryptographic device), to enable the service processing to be completed with only one flow into the cryptographic device, offloading processing pressure of the server CPU and the network bandwidth, and improving big data processing performance. In this embodiment, by improving the cryptographic device to enable the cryptographic device to simultaneously have the cryptographic computing function, the network card data processing function, and the data encoding and decoding processing function, etc., it is possible to avoid data packets flowing through lengthy processing links to the cryptographic device, and further save the data processing bandwidth of the server.

The following describes the method provided in the embodiments of the present disclosure from the perspective of the cryptographic device.

Figure 3:
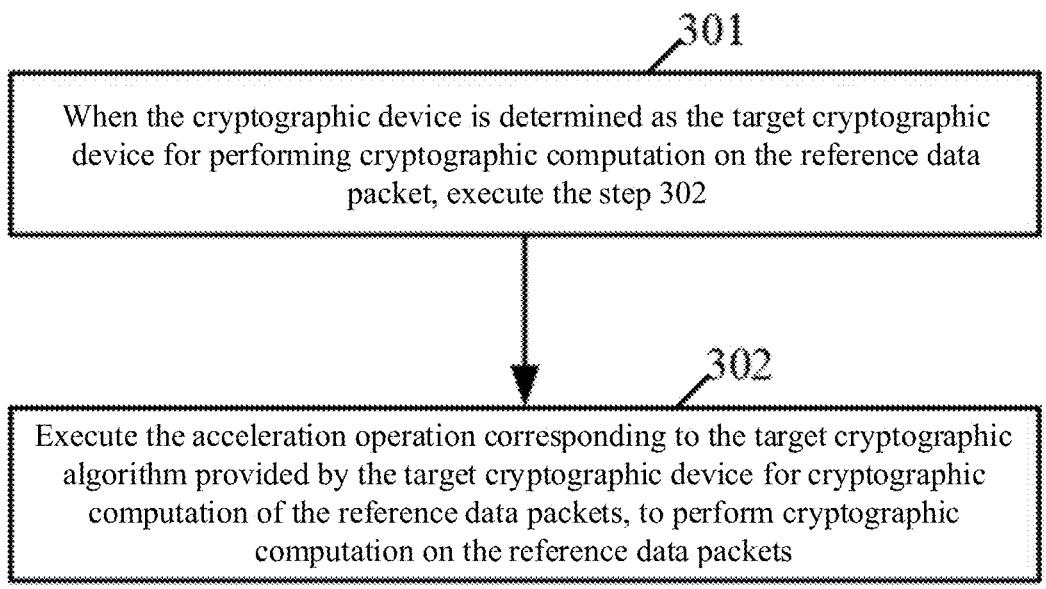
FIG. 3 is a flowchart of another method provided in embodiments of the present disclosure.

Referring to FIG. 3, FIG. 3 is a flowchart of a method for implementing high-speed cryptographic computation based on software-hardware collaboration provided in embodiments of the present disclosure. The method is applied to the cryptographic device. As shown in FIG. 3, the method may include the following steps 301 and 302.

In step 301, when the cryptographic device is determined as the target cryptographic device for performing cryptographic computation on the reference data packet, the step 302 is executed.

The reference data packet and the target cryptographic device for performing cryptographic computation on the reference data packet can refer to the descriptions in steps 101 and 102, and will not be repeated here.

In step 302, the acceleration operation corresponding to the target cryptographic algorithm is performed by the target cryptographic device, to perform cryptographic computation on the reference data packets.

In this embodiment, the acceleration operation can refer to the description in step 103, and will not be repeated here.

From the method shown in FIG. 3, it can be seen that in the embodiments of the present disclosure, when the one or more target resources include the target cryptographic device, the target cryptographic device executes, according to the characteristics of the target cryptographic algorithm used to perform cryptographic computation on the reference data packet, the acceleration operation corresponding to the target cryptographic algorithm for the cryptographic computation on the reference data packets, such as grouping the reference data packets, to improve a concurrent execution rate of an algorithm and cope with situations with a large amount of service concurrency and data processing.

The above describes the method provided in the embodiments of the present disclosure, and the following describes an apparatus provided in the embodiments of the present disclosure.

Figure 4:
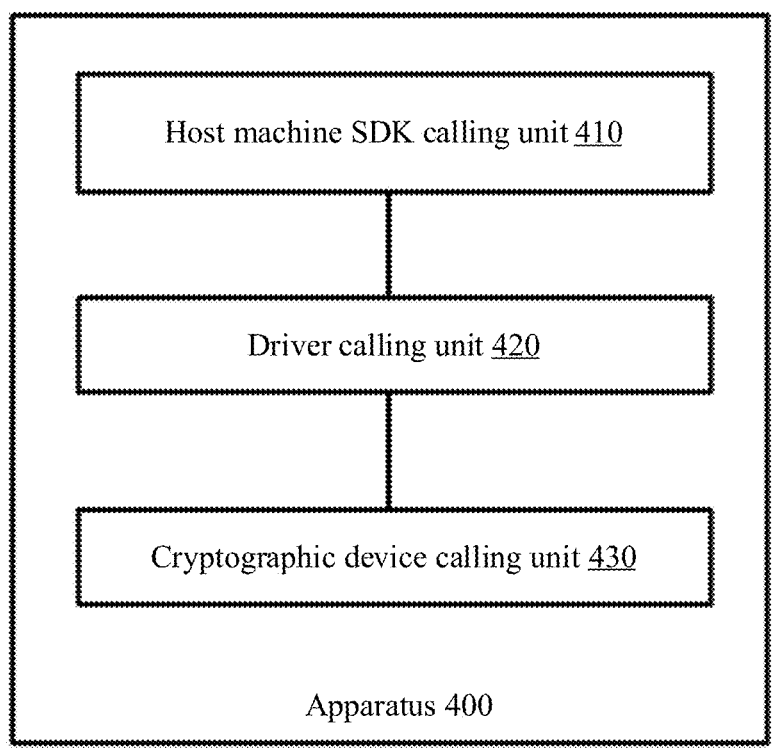
FIG. 4 is a schematic structural diagram of an apparatus provided in embodiments of the present disclosure.

Referring to FIG. 4, FIG. 4 is a structural diagram of an apparatus 400 for implementing high-speed cryptographic computation based on software-hardware collaboration provided in embodiments of the present disclosure. The apparatus 400 is applied to a server, and the server is equipped with at least one cryptographic device, and a host machine software development kit (SDK) and a cryptographic device driver that are compatible with the at least one cryptographic device. As shown in FIG. 4, the apparatus 400 includes an host machine SDK calling unit 410, a driver calling unit 420, and a cryptographic device calling unit 430.

The host machine SDK calling unit 410 is configured to perform a compliance check on a current to-be-processed data packet, and perform pre-processing on one or more current to-be-processed data packets that pass the compliance check to obtain one or more reference data packets. Where the pre-processing includes at least one of: according to a request type and a packet size of the one or more current to-be-processed data packets that pass the compliance check, splitting or recombining the one or more current to-be-processed data packets to enable a size of each of the reference data packets to meet an optimal packet size requirement corresponding to the request type; or performing encoding format conversion on a data packet that is to be transmitted to a cryptographic device driver that is compatible with the at least one cryptographic, to reduce coding redundancy.

The driver calling unit 420 is configured to, by the cryptographic device driver, according to current weight factors for available resources in the server corresponding to at least one to-be-executed cryptographic algorithm required by the reference data packets, determine one or more target resources from the available resources with a load balancing principle, where the available resources include the at least one cryptographic device. Where the available resources are software and hardware resources in the server capable of performing cryptographic computation on the reference data packets.

The cryptographic device calling unit 430 is configured to, when the one or more target resources include a target cryptographic device in the at least one cryptographic device, perform, by target cryptographic device, an acceleration operation corresponding to a target cryptographic algorithm, to perform cryptographic computation on the reference data packets. Where the target cryptographic algorithm is one of the at least one to-be-executed cryptographic algorithm provided by the target cryptographic device. Furthermore, when the target cryptographic algorithm is an SM4 algorithm in a CTR mode, the acceleration operation at least includes: by the target cryptographic device, grouping the reference data packets to obtain at least one group of reference data packets; according to an ECB mode different from the CTR mode, concurrently scheduling each group of reference data packets; and performing a specified mathematical operation on a processing result of the concurrent scheduling and an iteration result to obtain a concurrent acceleration result of the CTR mode. Where the iteration result is obtained by a deployed CTR software counter iterating according to a specified iteration specification.

Optionally, the available resources include: all software resources and all hardware resources in the server that are configured for cryptographic computation; or software and/or hardware resources in the server whose confidence matches a priority of the reference data packet.

Where the priority of the reference data packet is determined according to an evaluation score of the reference data packet from a classification evaluation perspective. The classification evaluation perspective at least includes: a sensitivity level of sensitive data involved in the reference data packet, an importance level of a service involved in the reference data packet, or an identity type of a request subject for the reference data packet.

Optionally, when the target cryptographic algorithm is an SM2 algorithm, the acceleration operation at least includes: identifying whether a target key exists in internal keys cached by the target cryptographic device, in response to identifying that the internal keys include the target key exists, performing cryptographic computation with the target key, and resetting a time-to-live of the target key. Where each of internal keys is decrypted in batches and cached into the target cryptographic device when a user bounded with the internal key passes identity authentication at first time, the internal keys at least include: a second level key, or a second level key and a third level key; and if the time-to-live of any one of the internal keys expires, the internal key is deleted Optionally, the driver calling unit 420 further analyzes the data profile within the set time period through the algorithm modeling and analysis engine built on the cryptographic device driver. Where the data profile can be used to analyze whether there is a risk, such that the user can timely adopt a corresponding repair strategy to repair the risk when there is a risk.

Optionally, the data profile represents at least one of: data traffic, including data traffic of a data channel between the cryptographic device driver and the resources for executing cryptographic computation within the set time period, and data traffic flowing through the resources within the set time period; frequency of usage, of each of the resources during the set time period; a load condition, indicating a computational load of each of the resources within the set time period; a stable computation parameter, indicating a failure rate of each of the resources within the set time period; or frequency of unauthorized access, indicating a number of unauthorized access during the set time period.

Figure 5:
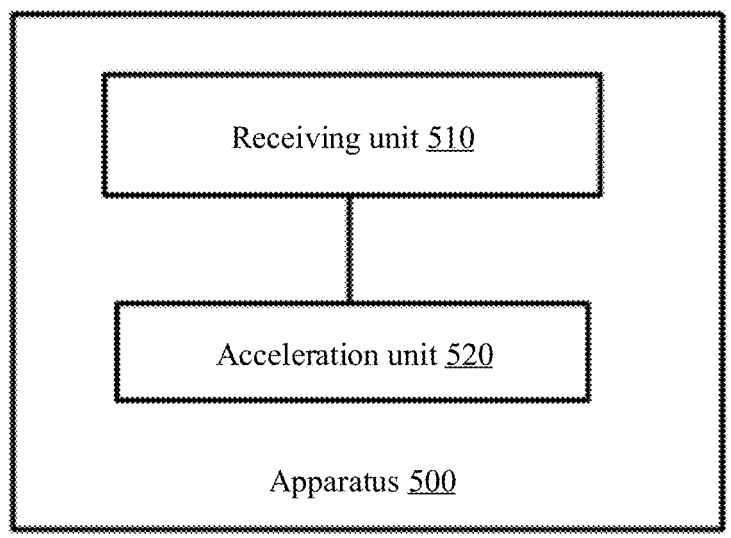
FIG. 5 is a schematic structural diagram of another apparatus provided in embodiments of the present disclosure.

Referring to FIG. 5, FIG. 5 is a structural diagram of an apparatus 500 for implementing high-speed cryptographic computation based on software-hardware collaboration provided in embodiments of the present disclosure. The apparatus 500 is applied to any cryptographic device equipped on the server. As shown in FIG. 5, the apparatus 500 may include a receiving unit 510 and an acceleration unit 520.

The receiving unit 510 is configured to, when the cryptographic device is determined to perform cryptographic computation on reference data packets, receive reference data packets to be subjected to the cryptographic computation. Where the reference data packet is obtained through the host machine SDK compatible with the cryptographic device pre-processing the one or more current to-be-processed data packets that pass the compliance check. The pre-processing includes at least one of: according to a request type and a packet size of the current to-be-processed data packet, splitting or recombining the one or more current to-be-processed data packets to enable a size of each of the reference data packets to meet an optimal packet size requirement corresponding to the request type; or performing encoding format conversion on a data packet that is to be transmitted to a cryptographic device driver, to reduce coding redundancy. The target cryptographic device for executing the at least one to-be-executed cryptographic algorithm is determined from the available resources with a load balancing principle, by the cryptographic device driver, according to current weight factors for available resources corresponding to at least one to-be-executed cryptographic algorithm required by the reference data packets. Where the available resources include the cryptographic device.

The acceleration unit 520 is configured to perform an acceleration operation corresponding to a target cryptographic algorithm, to perform the cryptographic computation on the reference data packets. Where the target cryptographic algorithm is one of the at least one to-be-executed cryptographic algorithm provided by the target cryptographic device.

Where when the target cryptographic algorithm is an SM4 algorithm in a CTR mode, the acceleration operation at least includes: by the target cryptographic device, grouping the reference data packets to obtain at least one group of reference data packets; according to an ECB mode different from the CTR mode, concurrently scheduling each group of reference data packets; and transmitting a processing result of the concurrent scheduling to a specified component of the server, where the specified component includes a CPU or a GPU, such that the specified component performs a specified mathematical operation on the processing result of the concurrent scheduling and an iteration result to obtain a concurrent acceleration result of the CTR mode; or the cryptographic device itself performs a specified mathematical operation on a processing result of the concurrent scheduling and an iteration result, to obtain a concurrent acceleration result for the CTR mode. Where the iteration result is obtained by a deployed CTR software counter iterating according to a specified iteration specification.

Optionally, when the target cryptographic algorithm is an SM2 algorithm, the acceleration operation at least includes: identifying whether a target key exists in internal keys cached by the target cryptographic device, in response to identifying that the internal keys include the target key exists, performing cryptographic computation with the target key, and resetting a time-to-live of the target key. Where each of internal keys cached in the target cryptographic device is decrypted in batches and cached into the target cryptographic device when a user bounded with the internal key passes identity authentication at first time, the internal keys at least include: a second level key, or a second level key and a third level key; and if the time-to-live of any one of the internal keys expires, the internal key is deleted.

Figure 6:
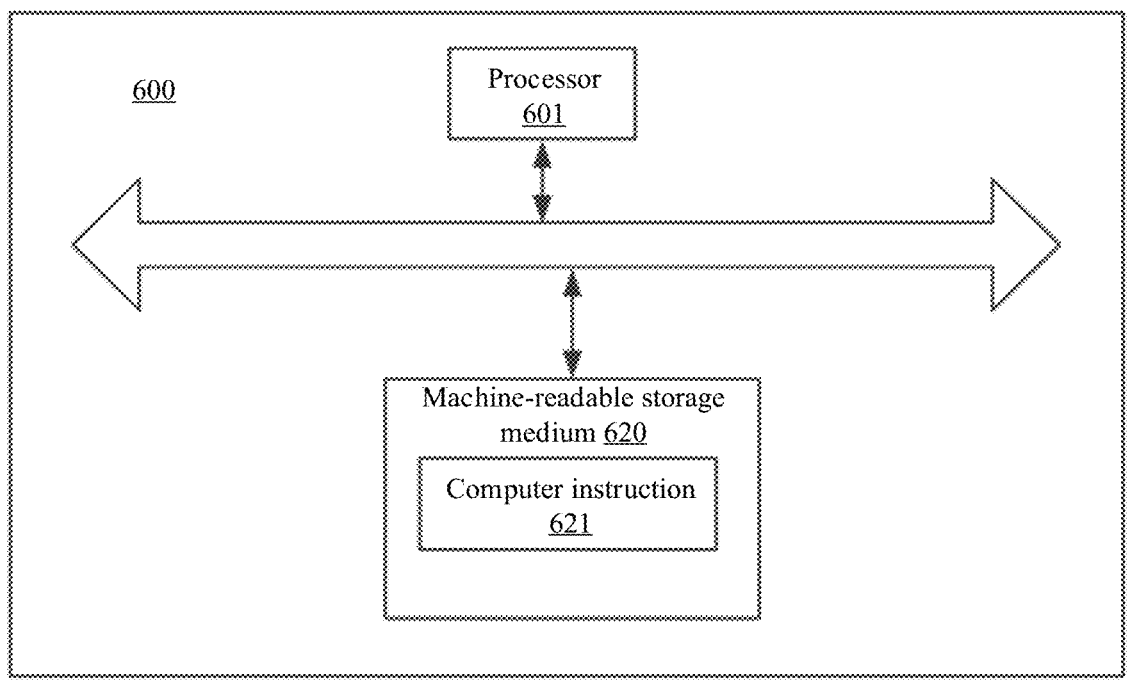
FIG. 6 is a structural diagram of an electronic device provided in embodiments of the present disclosure.

The embodiments of the present disclosure further provide hardware structure descriptions of the apparatuses shown in FIGS. 4 and 5. As shown in FIG. 6, an electronic device 600 may include a processor 610 and a machine-readable storage medium 620. The machine-readable storage medium 620 stores a number of computer instructions 621, and when the computer instructions 621 are executed by the processor 610, any one of the above methods is implemented.

According to the same concept as the above method, the embodiments of the present disclosure further provide a machine-readable storage medium, on which a number of computer instructions are stored. When the computer instructions are executed by the processor, the method according to any one of the above embodiments of the present disclosure can be implemented.

For example, the machine-readable storage medium can be any electronic, magnetic, optical, or other physical storage device that can contain or store information such as executable instructions, data, and so on. For example, the machine-readable storage medium may be a Random Access Memory (RAM), a volatile memory, a non-volatile memory, a flash memory, a storage drive (e.g. hard disk drive), a solid state harddisk, any type of storage disk (e.g., compact disk, Digital Video Disk (DVD)), or a similar storage medium, or a combination thereof.

The systems, apparatuses, modules, or units elucidated in the above embodiments can be implemented specifically by a computer entity, or by a product with certain functions. A typical implementation device is a computer, which can take the form of a personal computer, laptop, cellular phone, camera phone, smart phone, personal digital assistant, media player, navigation device, email sending and receiving device, game console, tablet computer, wearable device, or any combination of these devices.

For the convenience of description, the above devices are divided into various units according to their functions and described respectively. It is, of course, possible to implement the functions of each unit in the same or multiple software and/or hardware when implementing the present disclosure.

Those skilled in the art should understand that embodiments of the present disclosure can be provided as methods, systems, or computer program products. Accordingly, the present disclosure may take the form of an entirely hardware embodiment, an entirely software embodiment, or an embodiment combining software and hardware aspects. Furthermore, the embodiments of the present disclosure may employ the form of a computer program product implemented on one or more computer-usable storage media (including, but not limited to, disk storage, CD-ROM, optical storage, etc.), where the one or more computer-usable storage media having computer-usable program code.

The present disclosure is described with reference to the flowchart and/or block diagram of the method, device (system), and computer program product according to the embodiments of the present disclosure. It is to be understood that each process and/or block in the flowchart and/or block diagram, and the combination of processes and/or blocks in the flowchart and/or block diagram, may be implemented by computer program instructions. These computer program instructions may be provided to a processor of a general-purpose computer, a specialized computer, an embedded processor, or other programmable data processing device to produce a machine such that instructions executed by the processor of the computer or other programmable data processing device produce an apparatus for implementing a function specified in one or more processes of the flowchart and/or one or more blocks of the block diagram.

These computer program instructions may also be stored in a computer-readable memory capable of directing the computer or other programmable data processing device to operate in a particular manner such that the instructions stored in the computer-readable memory produce an article of manufacture including an instruction apparatus that implements the function specified in one or more processes of the flowchart and/or one or more blocks of the block diagram.

These computer program instructions may be provided to a processor of a general-purpose computer, a specialized computer, an embedded processor, or other programmable data processing device to produce a machine such that instructions executed by the processor of the computer or other programmable data processing device produce an apparatus for implementing a function specified in one or more processes of the flowchart and/or one or more blocks of the block diagram.

The above description is only embodiments of the present disclosure and is not intended to limit the present disclosure. For those skilled in the art, various modifications and changes may be made in the present disclosure. Any modification, equivalent replacement, improvement, etc. present the spirit and principle of the present disclosure shall be included in the scope of the claims of the present disclosure.

What is claimed is:

1. A method for implementing high-speed cryptographic computation based on software-hardware collaboration, wherein the method is applied to a server equipped with at least one cryptographic device, and comprises:
    by a host machine software development kit (SDK) that is compatible with the at least one cryptographic device, performing a compliance check on a current to-be-processed data packet, and performing pre-processing on one or more current to-be-processed data packets that pass the compliance check to obtain one or more reference data packets, wherein the pre-processing comprises at least one of: according to a request type and a packet size of the current to-be-processed data packet, splitting or recombining the one or more current to-be-processed data packets to enable a size of any one of the obtained reference data packets to meet an optimal packet size requirement corresponding to the request type; or performing encoding format conversion on a data packet that is to be transmitted to a cryptographic device driver, wherein a converted encoding format is to reduce redundant encoding data;

by a cryptographic device driver that is compatible with the at least one cryptographic device, according to current weight factors for a plurality of resources for a cryptographic algorithm required by the reference data packets, determining one or more target resources from the plurality of resources with a load balancing principle, wherein the plurality of resources comprise software and/or hardware resources in the server capable of performing cryptographic computation on the reference data packets, and the hardware resources in the plurality of resources comprise the at least one cryptographic device; and when the one or more target resources comprise a target cryptographic device, performing cryptographic computation on the reference data packets by executing an acceleration operation corresponding to a target cryptographic algorithm, wherein the target cryptographic algorithm is provided by the target cryptographic device for performing cryptographic computation on the reference data packets, wherein, when the target cryptographic algorithm is an SM4 algorithm in a counter (CTR) mode, the acceleration operation at least comprises:

firstly grouping the reference data packets by the target cryptographic device; according to an Electronic Codebook (ECB) mode different from the CTR mode, concurrently scheduling each group of data packets; and performing a specified mathematical operation on a processing result of the concurrent scheduling and an iteration result to obtain a concurrent acceleration result of the CTR mode, wherein the iteration result is obtained by a deployed CTR software counter iterating according to a specified iteration specification.

2. The method according to claim 1, wherein the plurality of resources capable of performing cryptographic computation on the reference data packets comprise at least one of:

all software resources and all hardware resources in the server which are configured for cryptographic computation; or software and/or hardware resources in the server whose confidence matches a priority of the reference data packet;

wherein the priority of the reference data packet is determined according to an evaluation score of the reference data packet from a classification evaluation perspective; and the classification evaluation perspective at least comprises: a sensitivity level of sensitive data involved in the reference data packet, an importance level of a service involved in the reference data packet, or an identity type of a request subject for the reference data packet.

3. The method according to claim 1, wherein when the target cryptographic algorithm is an SM2 algorithm, the acceleration operation at least comprises: firstly identifying whether a desired target key exists in a cache of the target cryptographic device, in response to identifying that the target key exists in the cache of the target cryptographic device, performing cryptographic computation with the target key, and resetting a time-to-live of the target key in the cache;

wherein for each of internal keys which already exist in the target cryptographic device, the internal key is decrypted in batches into the cache when a user bounded with the internal key passes identity authentication at first time, the internal keys at least comprise: a second level key, or a second level key and a third level key; and when the time-to-live of any one of the internal keys in the cache expires, the internal key is deleted.

4. The method according to claim 1, further comprising:

by an algorithm modeling and analysis engine built on the cryptographic device driver, analyzing a data profile within a set time period and outputting the data profile, wherein the data profile is configured to analyze whether there is a risk; and in response to determining that the data profile indicates a presence of the risk, repairing the risk by a corresponding repair strategy.

5. The method according to claim 4, wherein the data profile at least represents:

data traffic, comprising data traffic between the cryptographic device driver and resources for cryptographic computation within the set time period, and data traffic flowing through resources within the set time period;

frequency of usage, of each of resources during the set time period;

a load condition, indicating a computational load of each of resources within the set time period;

a stable computation parameter, indicating a failure rate of each of resources within the set time period; and frequency of unauthorized access, indicating a number of unauthorized accesses during the set time period.

6. A method for implementing high-speed cryptographic computation based on software-hardware collaboration, wherein the method is applied to any one of at least one cryptographic device equipped on a server, and comprises:

when identified as a target cryptographic device for cryptographic computation on reference data packets, performing cryptographic computation on the reference data packets by executing an acceleration operation corresponding to a target cryptographic algorithm, wherein the target cryptographic algorithm is provided by the target cryptographic device for performing cryptographic computation on the reference data packets;

wherein the target cryptographic device is determined from a plurality of resources with a load balancing principle, by a cryptographic device driver that is compatible with the at least one cryptographic device, according to current weight factors for the plurality of resources for a cryptographic algorithm required by the reference data packets, wherein the plurality of resources are software resources and/or hardware resources in the server capable of performing cryptographic computation on the reference data packets, and the hardware resources in the plurality of resources comprise the at least one cryptographic device; and the reference data packets is obtained through performing pre-processing on one or more current to-be-processed data packets that pass a compliance check by a host machine software development kit (SDK) that is compatible with the at least one cryptographic device, wherein the pre-processing comprises at least one of: according to a request type and a packet size of the current to-be-processed data packet, splitting or recombining the one or more current to-be-processed data packets to enable a size of any one of the reference data packets to meet an optimal packet size requirement corresponding to the request type; or performing encoding format conversion on a data packet that is to be transmitted to a cryptographic device driver, wherein a converted encoding format is to reduce redundant encoding data;

wherein when the target cryptographic algorithm is an SM4 algorithm in a counter (CTR) mode, the acceleration operation at least comprises:

by the target cryptographic device, grouping the reference data packets; according to an Electronic Codebook (ECB) mode different from the CTR mode, concurrently scheduling each group of data packets; and transmitting a processing result of the concurrent scheduling to a specified component of the server, wherein the specified component comprises a CPU or a GPU, such that the specified component performs a specified mathematical operation on the processing result of the concurrent scheduling and an iteration result to obtain a concurrent acceleration result of the CTR mode; or performing a specified mathematical operation on a processing result of the concurrent scheduling and an iteration result to obtain a concurrent acceleration result of the CTR mode; wherein the iteration result is obtained by a deployed CTR software counter iterating according to a specified iteration specification.

7. The method according to claim 6, wherein when the target cryptographic algorithm is an SM2 algorithm, the acceleration operation at least comprises:

identifying whether a desired target key exists in a cache of the target cryptographic device, in response to identifying that the target key exists in the cache of the target cryptographic device, performing cryptographic computation with the target key, and resetting a time-to-live of the target key in the cache;

wherein for each of internal keys which already exist in target cryptographic device, the internal key is decrypted in batches into the cache when a user bounded with the internal key passes identity authentication at first time, the internal key comprises: a second level key, or a second level key and a third level key; and when the time-to-live of any key in the cache expires, the key is deleted.

8. An electronic device, comprising:
one or more processors; and
one or more machine-readable storage media,
wherein the one or more machine-readable storage media store computer instructions, and when the computer instructions are executed by the one or more processors, the method according to claim 1 is implemented.

9. An electronic device, comprising:
one or more processors; and
one or more machine-readable storage media,
wherein the one or more machine-readable storage media store computer instructions, and when the computer instructions are executed by the one or more processors, the method according to claim 6 is implemented.

* * * * *